United States Patent
Mertes

[11] 3,807,269
[45] Apr. 30, 1974

[54] LENGTH GAUGE IN RADIAL AND CUTOFF SAWS

[76] Inventor: Paul Matthew Mertes, 15528 Don Metz St., Granada Hills, Calif. 91344

[22] Filed: Nov. 26, 1971

[21] Appl. No.: 202,299

[52] U.S. Cl. .................. 83/468, 83/471.2, 83/522
[51] Int. Cl. ..................... B26d 7/16, B27b 27/10
[58] Field of Search....... 143/174 R, 168 R; 83/467, 83/468, 471.2, 522

[56] References Cited
UNITED STATES PATENTS

| | | | |
|---|---|---|---|
| 2,518,728 | 8/1950 | Snow | 143/174 R |
| 3,124,181 | 3/1964 | Clemans | 143/174 R |
| 3,389,725 | 6/1968 | Tidwell | 143/174 R |

Primary Examiner—Donald R. Schran

[57] ABSTRACT

A length gauge is disclosed herein having a fixed gauge block mounting an eccentric cam for bearing against a movable length rod carrying a steel measuring tape. The block mounts a pointer alignable with a predetermined setting on the tape. A stop member is carried on one end of the rod and slidably moves on an elongated guide strip.

4 Claims, 6 Drawing Figures

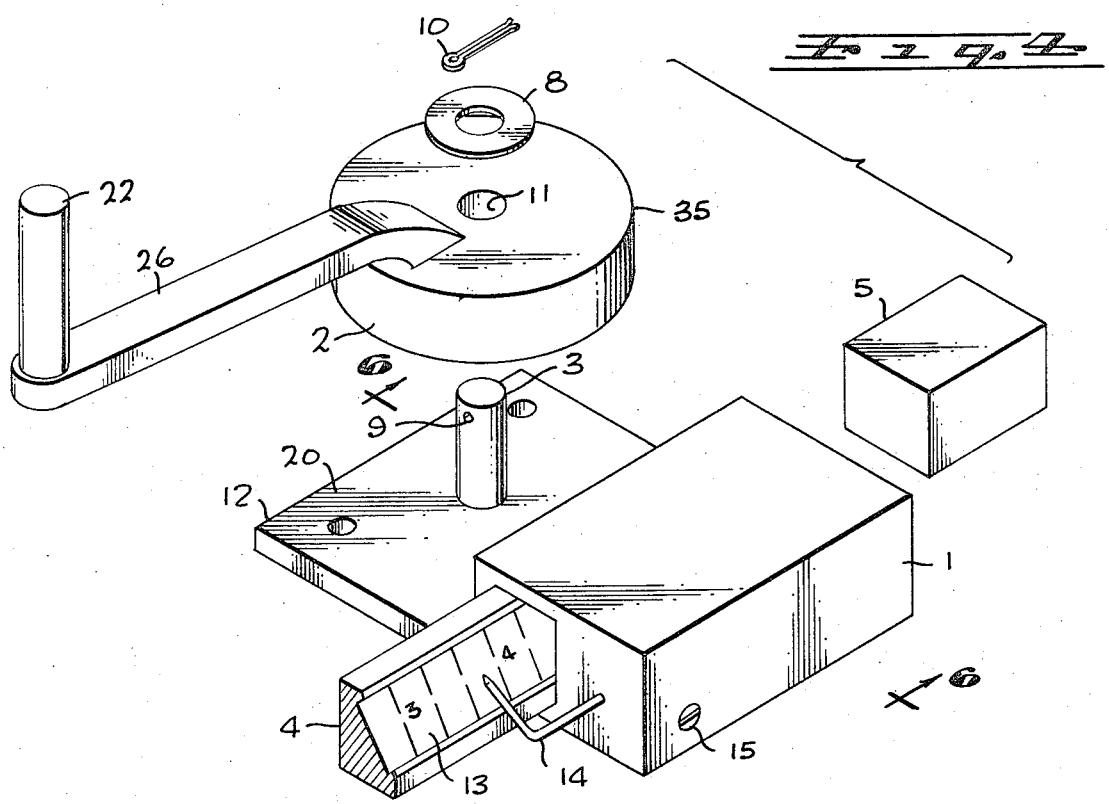
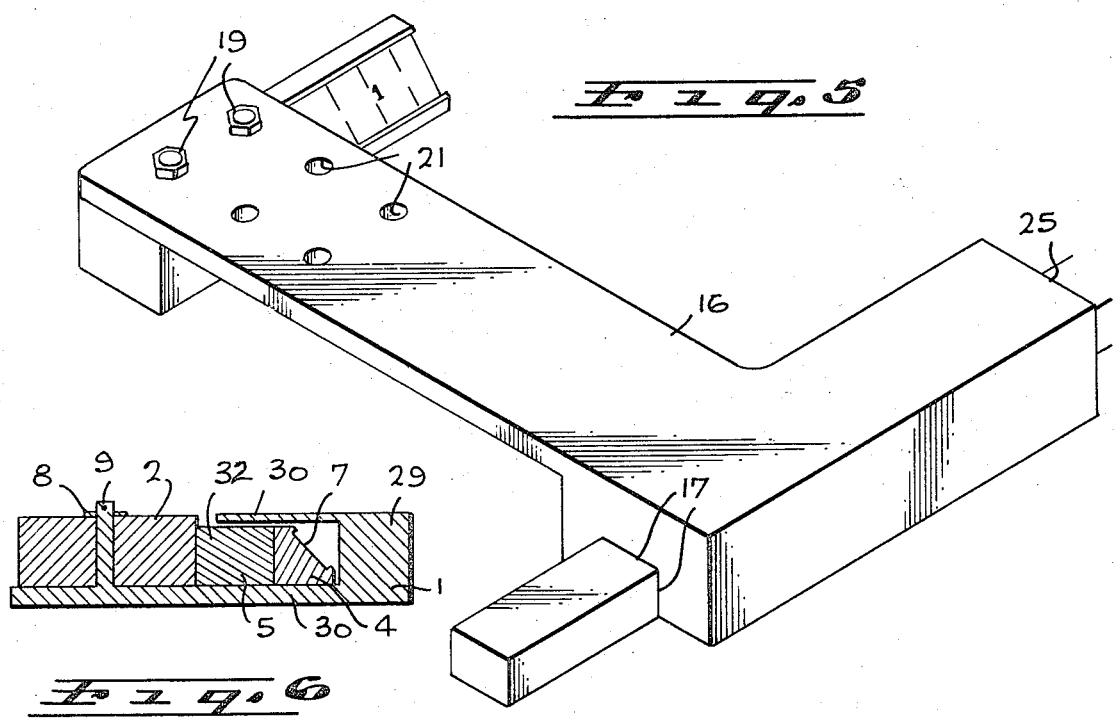

LENGTH GAUGE IN RADIAL AND CUTOFF SAWS

BRIEF SUMMARY AND BACKGROUND OF INVENTION

Gauges that are currently used with cut off saws and radial saws for the purpose of providing a means of cutting lumber or other materials to a predetermined length have the disadvantage of exposed steel tapes which can be damaged accidentally due to their exposed condition. The steel tape also wears out since it must constantly run over pulleys in operation.

An object of this invention is to provide a gauge that is very simple in construction and completely trouble free due to its novel and simple construction.

It is another advantage of this gauge to provide a movable rod with an attached steel tape and material stop that can be quickly set at any desired measurement and locked by moving a lever without the operator leaving the saw.

A further object and advantage is to provide a gauge where the steel tape used is completely protected from accidental damage, thereby providing troublefree performance for the gauge.

FIG. 4 is an exploded view of the rod locking device showing how the rod carrying the steel tape passes through one side and out the other and the dam and block that provide the means to lock the rod at any desired position.

FIG. 5 is an isometric view of the material stop. Showing how one end fastens to the end of the movable rod, and how the other end, having a channel along the length of its underside rides on and is held in relative position by the wood guide strip which is attached to the table of the saw.

FIG. 6 shows a sectional end view on line 2—2 of FIG. 4 showing the relationship of the parts of the rod locking device as they would appear if the device was assembled and operative.

DETAILED DESCRIPTION

Figure 1:
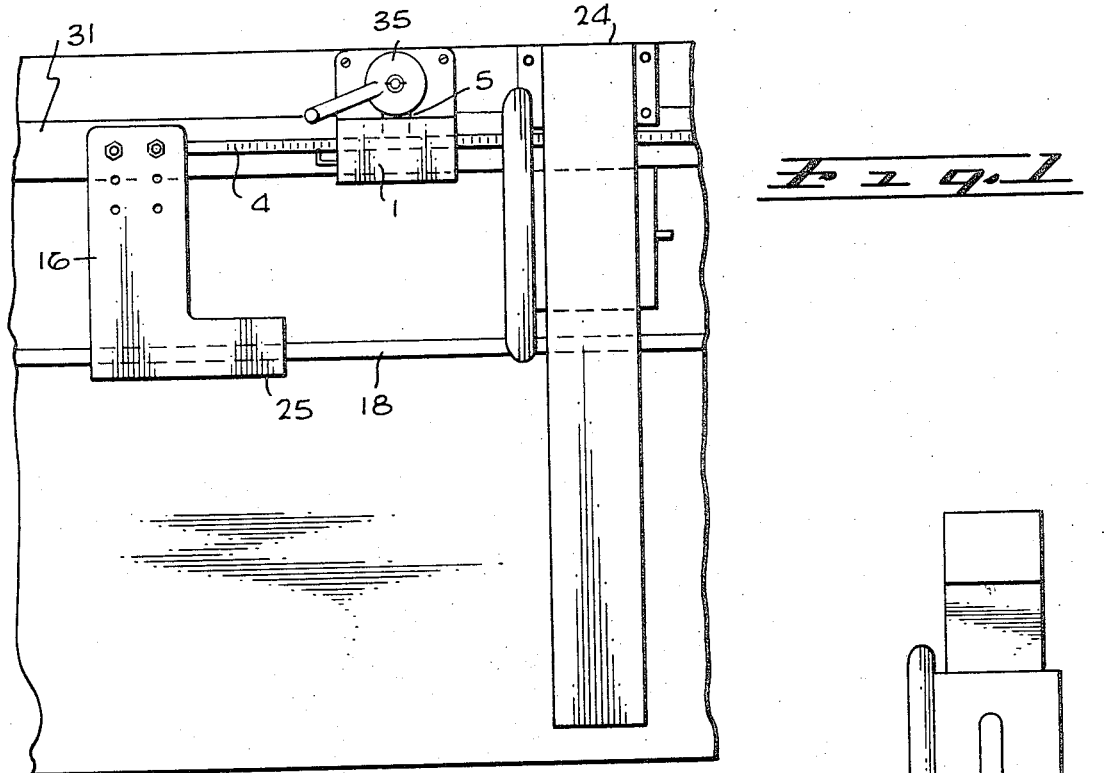
FIG. 1 is a plan view of a radial saw mounted on a saw bench, with the saw gauge mounted to the left of the saw in its operative position.
Figure 2:
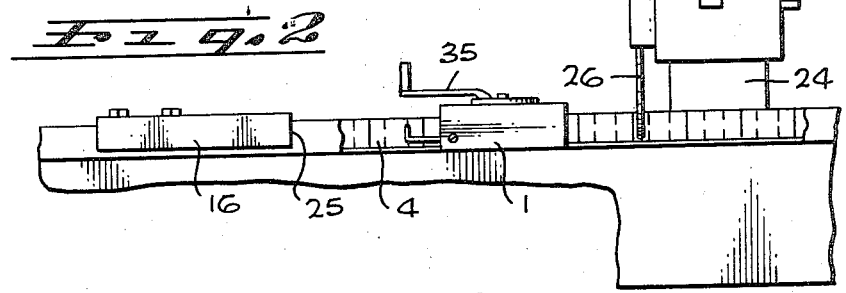
FIG. 2 is an elevation of a radial saw mounted and showing the gauge as it would appear when viewed from the front.
Figure 3:
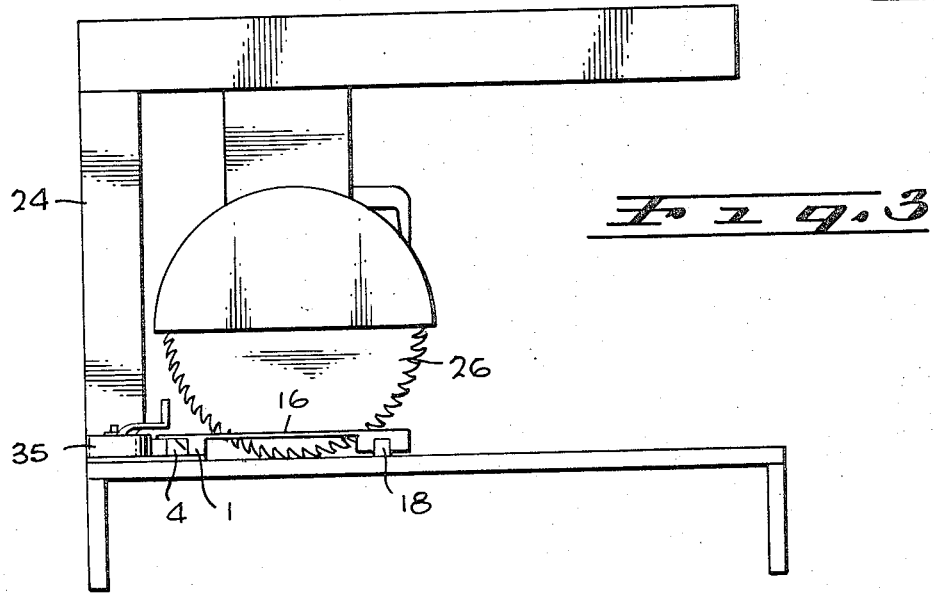
FIG. 3 is a side view of the gauge as it would appear mounted on a saw bench, and shows how the movable rod passes between the saw blade and the upright column that supports the radial arm saw.

In FIGS. 1 - 3 the rod locking device is shown where it would be located on the table saw so that the aperture 6, FIG. 5 will be in line with the space that exists between the saw blade and the upright column 24 of the saw. The rod can then move from left to right in this space as the gauge is being used.

In FIG. 2 a frontal elevation is shown. The rod locking device is shown mounted to the left of the saw. The material stop 16 is L shaped so that when the stop 16 which is attached to the rod 4 has been moved to the right so that it is touching the rod locking device. The portion of the stop that rides the wood strip 18 will extend to the right of the rod locking device far enough so that minimal lengths of material can be cut. There are wood strips 31 that extend to the left and right of the rod locking device. FIGS. 1 to 3. These strips of wood support the rod 4 which is raised slightly above the table of the saw due to the thickness of the bottom of the aperture 6, FIG. 6 of the main casting 1 of the rod locking device. The strips also provide a smooth surface for the rod 4 to slide upon. FIG. 3 shows how the blade 26 of the radial saw fits between the guide strip 18 and the sliding rod 4. It also shows how the channel 17 of the material stop 16 straddles the wood guide strip 18. In FIG. 5 the material stop 16 is shown attached by two bolts 19 to the rod 4. It is also seen how the Channel 17 fits over the guide strip 18. The stop has additional holes 21 for adjusting the stop since the distance between the rod 4 and the guide strip 18 will vary somewhat due to the use of saw blades of different diameters. The stop can be made of a tough plastic or a casting of aluminum. In FIG. 4, which shows an exploded view of the parts comprising the rod locking device, and FIG. 6 which shows a section of the rod locking device on line 2—2 of FIG. 4. The main part of this assembly is the main casting, which is an aluminum casting or other die cast material. The main casting has an aperture approximately 1 inch by three quarters of an inch, that runs from left to right through the casting which allows the rod 4 to pass through freely. This aperture 6 is formed by the wall sections 29 and top and bottom sections 30. There is another aperture 32 that enters the rear wall 29 of the main casting 1. FIG. 6, this aperture is to receive a fibre block 5 shown in FIG. 4 and FIG. 6, which shows its relationship to the face of the cam 2 and the back side of the rod 4. There is a lower surface 20 of the main casting 1 which is approximately one quarter of an inch thick. This surface has two countersunk holes 12 for attaching the casting 1 to the table of the saw. There is an upright shaft portion 3 which serves as a pivotal shaft for the cam component 35 of the rod holding device. This cam component consists of a disk 2, approximately three inches in diameter. This cam has a hole so that the cam can be mounted on the upstanding shaft 3. The hole is off center, therefore providing an eccentric camming means, the purpose of which will be detailed in a later paragraph. The cam portion 2 has an arm 26 that has an upright handle 22 at one end and curves downward at the other end where it meets the top surface of the cam 2. This allows the arm 26 to clear the material stop 16 rod 4 and the top of the main casting 1. The cam component is attached to the upstanding shaft 3 by a spring washer 8 and a cotter pin 10, which passes through a hole 9 of the shaft portion 3. The main casting 1 has a hole on the left side of the front wall portion 29. This hole receives an L shaped wire indicator 14 with a pointed end. The pointed end is in close proximity to the surface of the steel tape 13 that is mounted in the rod 4. There is another hole that intersects the hole that holds the wire indicator 14. This hole is tapped for its length to receive a set screw 15. The end of the set screw bears against the side of the wire indicator 14 and holds it in position. The set screw also allows the gauge to be adjusted to a fine degree by loosening the screw and positioning the pointer to the left or right of its previous setting, this being determined if the material being cut was undersized or oversized. Adjustments may have to be made due to such causes as saw blade changes, the saw may have shifted slightly or the indicator 14 being moved accidentally. The rod 4, FIGS. 4 and 5 can be an aluminum or tough plastic extrusion or be made of a hardwood such as maple or ash. The rod is approximately 1 inch by three quarters of an inch high. The length of the rod can be of varying lengths depending on the use that the gauge is being used for. The face is beveled at about 45° and this face has a channel 7 about one eighth of an inch deep. The width of the channel 7 is slightly less than the width of a one half inch wide steel measuring tape. This allows the tape to be pressed into the channel and secures itself by pressing against the sides of the channel 7.

A detailed description of how the parts of the gauge function as it is operated will now be explained in detail. An arbitrary length of material will be cut. It will be assumed that the rod locking device is in a locked condition and that the arm 35 of the cam 35 is at about a 45° angle with the rod 4 as in FIG. 1. Now as the operator faces the saw, he will grasp the handle 22 of the cam 35. Now as the handle is forced to rotate toward the rear of the saw table the fibre block 5, FIG. 6 which was being forced by the face of cam portion 2 into the back side of the rod 4 which in turn forces the face of rod 4 into the back side of the front wall portion 29 of the rod locking device, and the rod 4 and the attached material stop 16 as such is therefore in a static and securely locked condition. Now as the handle has been rotated to the rear, the face of the cam portion 2 will have released pressure on the fibre block 5 and the block in turn released pressure on the rod 4. The rod 4 can now be moved freely in either a left or right direction. The operator can now grasp the rod 4 with his left hand and slide the gauge rod 4 in the direction desired. The desired number on the rod can be brought into the area of the rod locking device very quickly. The whole number or the whole number and a fractional part can then be lined up with the pointed end of the indicator 14. The operator can then grasp the handle 22 of the cam device 35 and by rotating it in a forward direction, the face of the cam portion 2 is then forced against the fibre block 5. The fibre block forcing against the rod 4 and thereby locking the rod in frictional engagement with the main casting 1 of the rod holding device. This frictional engagement is very strong and relatively heavy. Pieces of wood can be slid into the face 25 of the material stop 16 with a good deal of force without the rod 4 slipping with its frictional engagement with the main casting 1 and the fibre block 5.

In summary, this gauge consists of a relatively flexible rod with a graduated scale attached in the form of a steel measuring tape, and having attached at one end a material stop at right angles that is guided by its engagement with a guide strip that attaches to the saw table. The rod passes through a cam operated rod locking device that can be operated with a handle by the saw operator to hold or release the rod so that the rod can be moved in a right or left direction until the desired length to be cut is found on the rod and lined up with an indicator on the rod locking device. The rod can then be locked by moving the lever located on the rod locking device. The material to be cut can then be slid against the wood guide strip until the material contacts the material stop and the saw operator can then cut off the length desired.

What I claim as my invention

1. In a length gauge for cutting material to any predetermined length on a radial saw or cut-off saw having a fixed table and a movable saw-blade, the combination comprising:
   a stationary cam operated locking device and a movable rod with a graduated scale;
   said stationary rod locking device mounting on said saw table near said saw blade;
   said movable rod passing through an aperture that extends from left to right through said rod locking device;
   said aperture being aligned with the space between the upright column of said saw table and the rear of said saw blade;
   said movable rod having a grooved face to carry a steel measuring tape;
   said rod having at one end a right angle material stop attached;
   said material stop having a grooved underside that rides a guide strip attached to said saw table;
   said gauge being used by means of the operator releasing said rod by rotating a handle of a cam which is pivotally mounted on said rod locking device releasing from frictional engagement with the rear of said movable rod and said face of said rod with frictional engagement with a main portion of said rod locking device;
   said guage rod then being grasped by the saw operator and moved left or right until the desired number on said steel tape of said rod is made to line up with the point of said indicator attached to said rod locking device; and
   said handle of said cam is then rotated forcing said fibre block into frictional holding engagement with said rod thereby allowing material to be cut to contact the face of said material stop permitting the saw operator to cut to the desired length of material.

2. A length gauge for a powered saw comprising:
   a stationary gauge block;
   a length rod having a recessed steel measuring tape along one side thereof and slidably disposed with respect to said stationary gauge block;
   an eccentric cam rotatably carried with respect to said length rod and engagable therewith for releasably holding and retaining said length rod in a selected position with respect to said gauge block;
   a pointer cantilevered on said gauge block in close proximity to said steel measuring tape;
   a stop member carried on a selected end of said length rod; and
   an elongated stationary guide strip disposed in fixed spaced apart relationship with respect to said gauge block and substantially parallel to said length rod and slidably supporting said stop member whereby said length rod and said stop member slide on said gauge block and said guide respectively for aligning said pointer with a predetermined measurement on said steel tape.

3. The invention as defined in claim 2 including:
   a handle fixed on said cam for manual rotation of said cam.

4. The invention as defined in claim 3 wherein:
   said guide strip includes an open groove on its underside slidably engagable with said elongated guide.

* * * * *